United States Patent Office 2,781,207
Patented Feb. 12, 1957

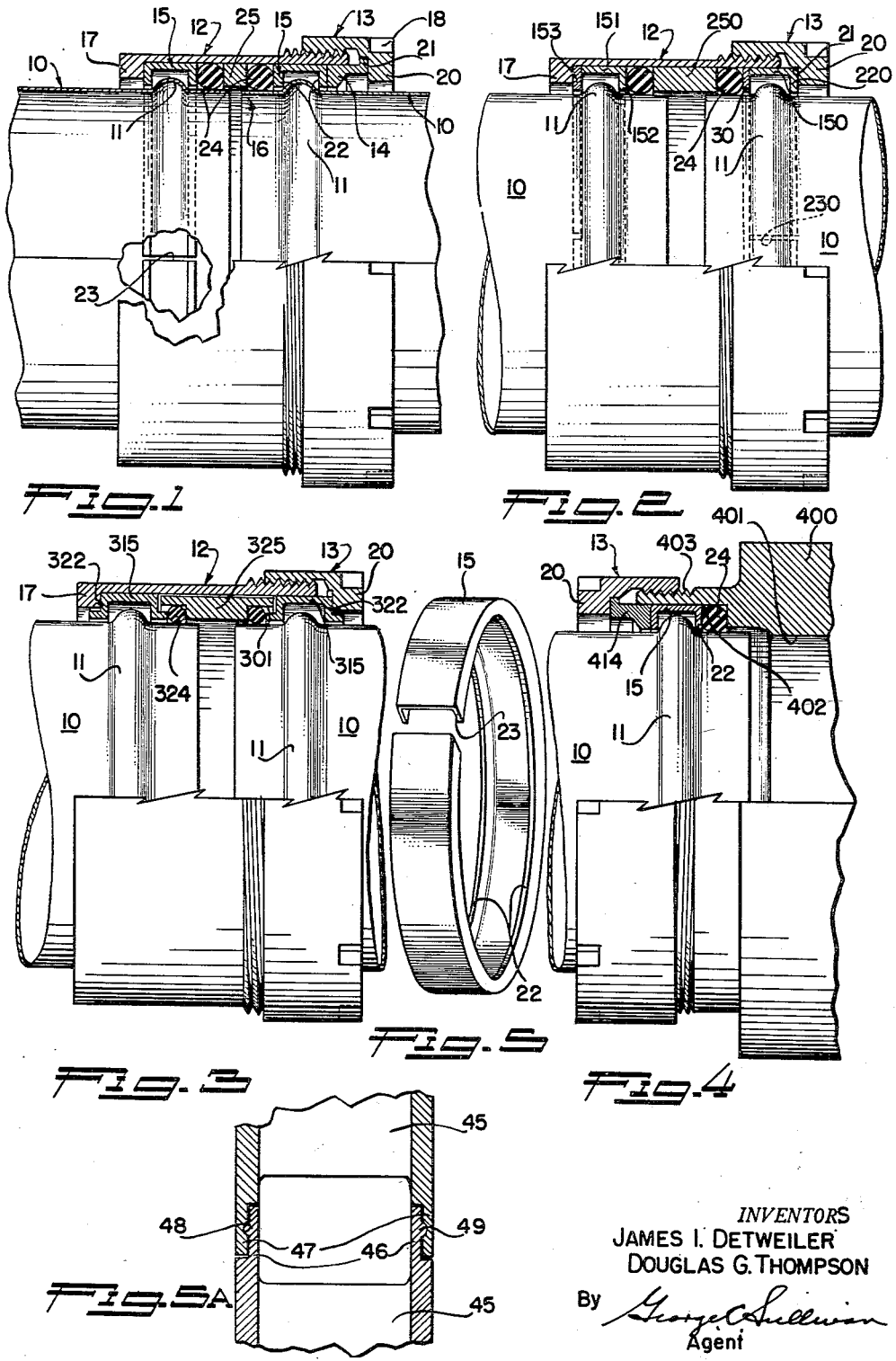

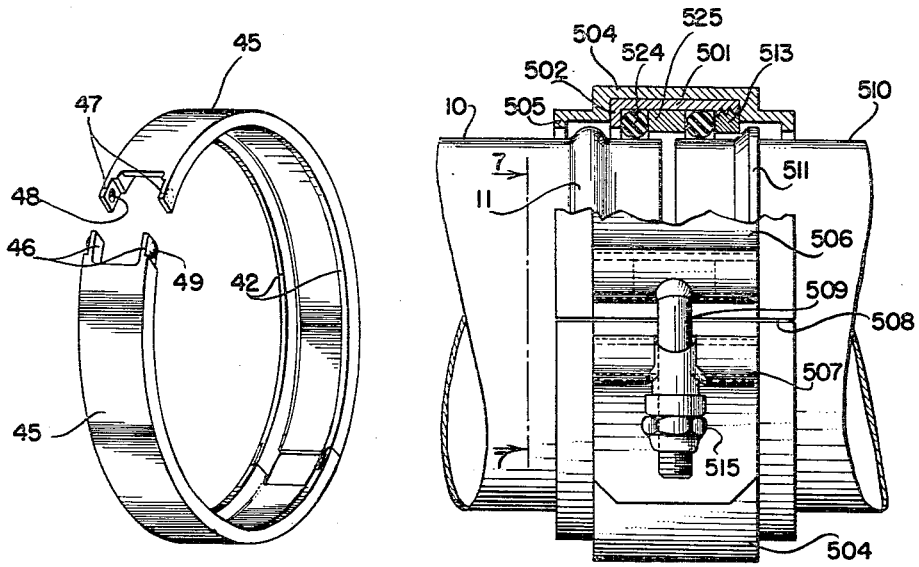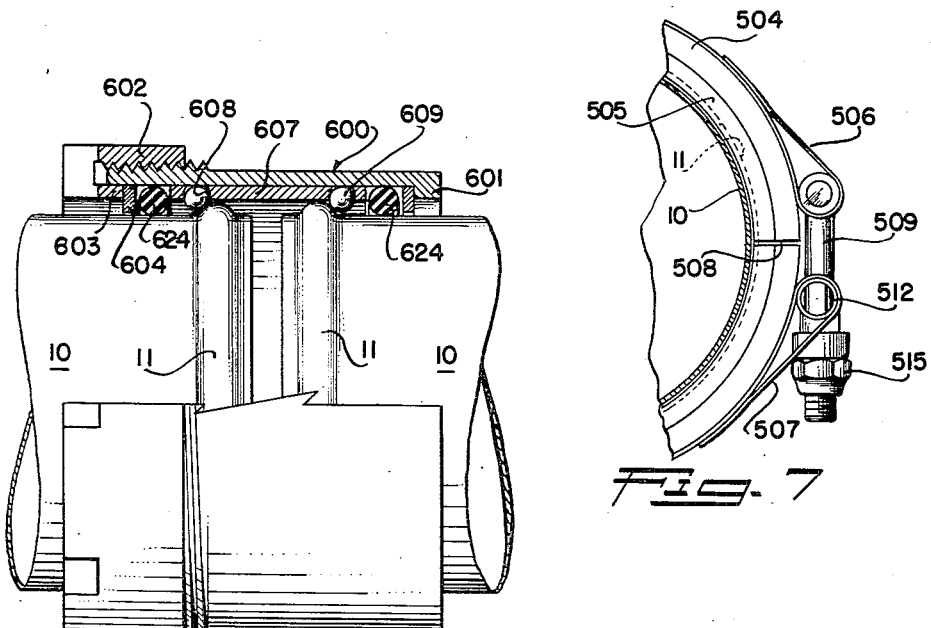

2,781,207

FLEXIBLE COUPLINGS FOR BEADED TUBING

James I. Detweiler, Burbank, and Douglas G. Thompson, Los Angeles, Calif., assignors to Lockheed Aircraft Corporation, Burbank, Calif.

Application January 12, 1953, Serial No. 330,842

3 Claims. (Cl. 285—233)

This invention relates to couplings and relates more particularly to couplings for connecting tubes, pipes, and the like, for handling fluid under pressure.

The present invention relates to the general types of couplings disclosed in our earlier application, Serial Number 247,858 filed September 22, 1951, now abandoned, which are designed to flexibly connect the ends of pipes and tubes of the class provided adjacent their ends with external beads for engagement by the couplings. In such couplings it is necessary to maintain effective fluid pressure tight seals and yet permit relative angular or pivotal movement between the connected tubes while positively holding the tubes against separation. Prior to our earlier invention difficulty was encountered in providing and maintaining effective fluid tight seals in such couplings, particularly those of large diameter for use with tubes carrying fluid at substantial pressures. In the prior couplings in general use the seals consisted of rings of rubber or synthetic rubber arranged so as to be compressed against the beads of the tubes or against other surfaces by the axial or endwise loads developed by the internal fluid pressures within the tube system itself and in some of the earlier couplings threaded glands or nuts were used to compress the seal rings. Where the fluid pressure is high and/or when the tubes are of large diameter, the heavy end loads tending to separate the adjacent tube ends were transmitted directly through or to the seal rings of these prior couplings and soon distorted and extruded the rings to such an extent that they no longer prevented the leakage of fluid. The tightening down of threaded nuts or followers to actuate or compress the seal rings also distorted and extruded the seal rings.

In our earlier invention, above referred to, these shortcomings of the prior couplings were overcome and avoided by coupling constructions wherein the axial or endwise forces developed by the fluid pressure in the tubing system were directly transmitted from one tube to the other by metal collars cooperating with the beads of the tubes, thus relieving the seal rings of all such loads and forces. Further, simple O rings were employed which require no actuation, compression or distortion by threaded glands, or the like. A typical coupling of our earlier invention included a collar, such as just mentioned, cooperating with the beads of the adjacent tube ends, a body engaged around the collar to retain and support the same, and the seal rings positioned beyond the ends of the collar and sealing between the external surfaces of the tubes and the internal surface of the body. In the present invention there are separate collars cooperating with the beads of the two adjacent tubes, these collars cooperating with the surrounding body for the assumption and transmission of the axial or end loads and the seal rings are positioned between the collars and the ends of their related tubes to seal between the surfaces of the tubes and the internal wall of the body. This construction retains the desirable attributes and features of our earlier invention and at the same time is adaptable for use in situations where the tube beads have non-standard positions.

It is therefore an object of the present invention to provide flexible tube couplings of the kind described wherein the seal rings are not subjected to the heavy end loads developed by the fluid pressures and, therefore, are not excessively distorted or extruded, which couplings are characterized by a novel arrangement and relationship between the bead engaging collars and the surrounding body whereby the heavy end loads are assumed by these metal or rigid material elements and whereby the seal rings are positioned between the beads and the adjacent ends of the related tubes to seal with the tube surfaces and the internal surface of the body. This characteristic arrangement in addition to relieving the seal rings of the heavy end loads and permitting the use of simple O ring seals has other advantages. For example it readily adapts the coupling for use on tubes where the beads are in non-standard positions, making the couplings more universally adaptable.

Another object of the inveniton is to provide a coupling of the character mentioned wherein the retainers or collars for co-operating with the beads of the tubing also engage with parts on the coupling body, one retainer engaging an internal flange on the body, the other engaging an adjustable gland nut on the body for positively transmitting the end loads to the coupling body. The adjustability of the nut permits packing take-up so that the O ring seals are properly confined for effective operation, it being understood that this type of seal does not require axial compression by mechanical means such as a threaded nut, but is actuated by the fluid pressure itself acting axially on the rings.

Another object of the invention is to provide couplings of this kind wherein the collars or retainers not only cooperate with the beads of the tubes and the flanges and nuts of the surrounding body but also provide abutments for the seal rings. In some embodiments of the invention the retaining collars have integral internal flanges providing confining or retaining abutments for the O rings while in other cases washers are arranged at the ends of the collars for this purpose.

Another object of the invention is to provide flexible couplings of the class described wherein the retainers or collars are engageable with regular spun or formed beads on the tubes, are engageable with machined beads or flanges on the tubes, or with similar beads on bosses or fittings on mechanisms and elements such as pumps, tanks, and the like.

A further object of the invention is to provide a coupling of this nature characterized by an internal sealing cartridge incorporating seal rings for sealing with the two tubes and a collar confining the rings provided with a take-up nut for adjusting the seal rings, which cartridge is adapted to be held within an incircling clamp, clamshell structure, or the like, to facilitate assembly on the tubes. The cartridge is readily arranged on the tubes between their respective beads by engaging it on one end portion of one tube and then slipping the end portion of the other tube into it and the encircling clamp is then arranged around the cartridge and tightened down to receive and confine the same, the clam-shell or clamp being engageable by the beads of the tubing to assume the axial separating forces or loads.

A still further object of the invention is to provide a continuous or non-split collar or retainer having ball detent means for cooperating with the tubing beads after its arrangement on the ends of the tubes and adapted to be confined within the coupling body which holds its ball detents in cooperation with the beads to assume the end loads. This ball detent structure is advantageous in couplings for relatively small tube sizes and for high-pressure applications.

Other objectives and features of the invention will become apparent from the following detailed description of typical preferred forms and applications, throughout which description reference will be made to the accompanying drawings wherein:

Figure 1 is a side elevation of one form of coupling of the invention with the upper portion of the assembly broken away to appear in vertical cross section and with a part of one of the tubes broken away to illustrate the split in one of the retainers;

Figure 2 is a side elevation of another coupling of the invention with a portion appearing in longitudinal or vertical cross section;

Figure 3 is a view similar to Figure 2 illustrating another form of coupling of the invention;

Figure 4 is a coupling means of the invention associated with a female boss and the end portion of a tube;

Figure 5 is a perspective view of a retainer or collar such as used in the couplings of Figures 1, 2 and 4;

Figure 5A is an enlarged fragmentary sectional view of a snap hinge portion of a sectional hinged type of retainer or collar;

Figure 5B is an enlarged perspective view of the sectional hinged retainer;

Figure 6 is a view similar to Figures 2 and 3 illustrating a coupling of the invention incorporating a clamp body;

Figure 7 is a fragmentary end view taken substantially as indicated by line 7—7 on Figure 6; and Figure 8 is a view similar to Figure 2 illustrating a coupling of the invention incorporating ball detent means.

The couplings of this invention are adapted to be employed to connect the adjacent ends of tubes provided with standard or special beads and may connect such tubes with bosses or fittings on pumps, tanks, and other elements. In the drawings we have shown several typical forms and applications of the invention and where corresponding elements appear in the several figures of the drawings corresponding reference numerals are employed. In Figures 1, 2, 3 and 8 we have shown two tubes 10 arranged in adjacent end to end relation and each provided with an integral external bead 11. The tubes 10 have their ends in spaced adjacent and opposing relation and the beads 11 are spaced short distances from these ends. In this connection it is to be understood that the beads 11 may or may not be spaced the standard or usual distance from the ends of their respective tubes 10, it being a feature of the invention that the couplings may be designed or adapted for use on tubes having beads of standard and non-standard configuration and construction positioned at various distances from the ends of the tubes. The particular beads 11 illustrated are of standard or conventional configuration and are spun, pressed or rolled in the tubes, it being apparent that they may be formed or provided in other ways either as integral or non-integral parts of the tubes, and when non-integral mechanically secured or attached to the tubes. The coupling of the invention illustrated in Figure 1 may be said to comprise, generally, a coupling body 12 having a threaded nut 13 and a follower 14, retainers or collars 15 in the body 12 cooperating with the beads 11 of the tubes 10, and seal means 16 in the body 12 between the collars for sealing with the tubes 10 and body 12.

The body 12 is a tubular element proportioned to be arranged around the adjacent end portions of the tubes 10 to surround the tubes and their beads 11 with substantial clearance. One end of the body 12 is provided with an internal or inwardly projecting annular flange 17 for engagement by one of the retainers or collars 15. The flange 17 has an internal diameter greater than the diameter of the beads 11 to pass over the beads. The body 12 may be of uniform internal diameter except for the flange 17 and, in fact, may be of uniform external diameter except at the region of attachment of the nut 13 to be later described. In this connection it is to be observed that the body 12 need not be much larger in diameter than the tubes 10 and that the coupling requires a minimum of space for its installation.

The abovementioned nut 13 is threaded on an end of the body 12 and is castellated having a plurality of wrench notches 18 for facilitating its installation, adjustment and removal. The nut 13 is further provided with an inwardly projecting annular lip or flange 20 for cooperating with the abovementioned follower or gland 14. The gland 14 is a tubular or ring-like part adapted to slidably engage in an end of the body 12 and the outer side or end of the gland is engaged by the inner surface of the nut flange 20. The flange 20 and gland 14 surround the related tube 10 with considerable clearance to pass over the bead 11 and to allow for free angular relative movement of the tubes. The gland nests 14 in an annular recess 21 in the flange 20, this nesting engagement and the engagement of the gland in the body 12 serving to centralize and strengthen the gland nut and body assembly.

The collars or retainers 15 cooperate with the tubing beads 11, there being a retainer 15 for each bead. In accordance with the invention the retainers 15 serve to transmit the axial or end loads developed by the fluid pressure in the tube system from the tubes 10 to the body 12, and are therefore constructed of metal or other rigid material of high or relatively high strength. The retainers 15 are annular or ring-like and are U shaped or channel shaped in transverse cross section, having internal annular flanges 22 at their opposite ends. As shown in the drawings the collars or retainers 15 straddle or receive their respective tube beads 11. The retainers 15 are received in the body 12 to have their peripheral surfaces engage the internal surface of the body and their flanges 22 extend radially inward at the opposite sides of their related beads 11 as clearly shown in Figure 1. In order to facilitate assembly the retainers or collars 15 are split longitudinally at 23 and are sufficiently flexible and resilient to be readily sprung over the beads 11 to have their flanges 22 straddle the beads. The inner peripheries or edges of the flanges 22 have suitable clearance with the tubes 10 so as not to interfere with the flexibility of the coupling but the flanges and beads are related so as to have positive cooperation or engagement. One retainer 15 has one end and flange 22 bearing against the end flange 17 of the body 12 and the other retainer 15 has one end and one flange 22 engaged by the inner end of the gland 14. Thus it will be seen that the retainers 15 straddling and engaging their respective tubing beads 11 and cooperating with the body flange 17 and gland 14 serve as force transmitting elements for transmitting the axial loads and forces generated by the fluid pressure in the tubing system from the tubes 10 to the body 12, the body 12 in turn acting as a mechanical coupling for the tubes. In couplings of small and relatively small sizes where the retainers 15 have limited flexibility the retainers, instead of being split at only one side, may be made in two or more partially circular sections.

The seal means 16 is arranged between the two retainers or collars 15 and includes two seal rings 24 and a spacer 25 between the seal rings. The seal rings 24 are preferably of the O ring type, being rings of round cross section formed of rubber, rubber composition, synthetic rubber, or other appropriate sealing material. The spacer 25 may be a simple annular part of square or rectangular cross section arranged in the body 12 to occupy the same plane as the space or gap between the ends of the two tubes 10 and the spacer is of sufficient length to overlap or surround the extremities of the tubes with suitable clearance. The O rings 24 are positioned between the ends of the spacer 25 and the inner ends of the retainers 15 so that the retainers and spacer serve to confine the seal rings and retain them in their operative positions.

The seal rings 24 have sealing engagement with the external surfaces of the tubes 10 and the internal surface of the body 12, being proportioned to initially have interference or engagement with these surfaces. As is well known, it is usually unnecessary to mechanically compress O rings seals axially and the fluid pressure from the tubes 10 admitted through the space between the ends of the tubes and past the spacer 25 acts outwardly against the seal rings 24 to actuate the same, that is to compress the seal rings in the axial direction against the retainers 15. This compression of the seal rings 24 forces and maintains them in pressure tight leak-proof cooperation with the surfaces of the tubes 10 and the internal surface of the body 12. It is to be particularly noted that any axial forces tending to separate the two tubes 10 developed by the fluid pressure in the line or otherwise are not transmitted through the seal rings 24 and cannot cause excessive compression, distortion or extrusion of the seal rings. All such loads and forces are transmitted from the beads 11 to the retainers 15 and thence to the body 12, the body acting as a force assuming coupling element. The nut 13 may be actuated or adjusted to position and confine the seal rings 24 for the most efficient operation.

Figure 2 illustrates another coupling of the invention similar to the coupling of Figure 1 but incorporating several distinctive features. In this coupling the follower or gland 14 is omitted and the nut 13 directly engages a collar or retainer 150 which may have its outer corner nest in the annular depression 21 of the nut. The retainer 150 is an annular part fitting within the body 12 and having only one end flange 220 extending radially inward toward the tube 10. This flange 220 has some clearance with the tube 10 but is engageable by the bead 11 of the tube to receive outward axial forces or loads. The flange 220 in turn bears against the flange or lip 20 of the nut 13 to transmit these loads to the body unit. The retainer 150 is split axially at 230 so as to be readily sprung over the related tubing bead 11. A continuous or unsplit washer 30 is arranged at the inner end of the retainer 150. The washer 30 being unsplit and continuous presents an uninterrupted surface for engagement by the adjacent seal ring 24, thus avoiding any possibility of cutting or abrading of the seal ring. It is to be noted that the continuous unsplit washer 30 is employed instead of the second or inner retainer flange such as used in the coupling of Figure 1. The washer 30 fits in the body 12 and its inner edge or periphery has suitable clearance with the surface of the adjacent tube 10.

The coupling of Figure 2 includes a second collar or retainer 151 fitting within the body 12 and having only one inwardly projecting annular lip or flange 152. This flange 152 is at the inner end of the retainer 151 and cooperates with or forms the abutment for the related seal ring 24. The inner periphery or edge of the flange 152 has suitable clearance with the adajcent tube 10. In accordance with the invention the retainer 151 and its flange 152 are continuous, unbroken or unsplit, the retainer being such that it may be slid over the end portion of the related tube 10 without interference with its bead 11. Thus the retainer 151 presents an unbroken or uninterrupted flange 152 for cooperation with its related seal ring 24 to avoid any possibility of cutting or abrading of the seal ring. It is to be noted that in the coupling of Figure 2 the seal rings 24 both bear against unsplit continuous, interrupted abutments. A washer 153 is arranged at the outer end of the retainer 151 to cooperate with the body flange 17. The washer 153, which is split, has clearance with the periphery of the related tube 10 but is engageable by the tube bead 11 for the transmission of axial forces or loads from the tube to the body 12. In the coupling of Figure 2 an annular continuous or unsplit spacer 250 is engaged in the body 12 between the two seal rings 24. This spacer 250 corresponds in function with the spacer 25 above described, being in the plane of the space or gap between the opposing ends of the tubes 10 and surrounding the terminal portions of the tubes. Where the gland 14 is omitted and where the space or gap between the ends of the opposing tubes 10 is relatively wide, the spacer 250 may have considerable length as shown.

The function and operation of the coupling shown in Figures 1 and 2 are substantially identical. The seal rings 24 are the only elements of the coupling having direct radial contact with the tubes 10, assuming the tubes to be axially aligned, and constitute fulcrums for allowing relative angular or pivotal movement of the tubes. This imparts the desired flexibility to the coupling. When under substantial internal fluid pressure the retainers 15, 150 and the washer 153 are engaged by the beads 11 for the transmission of the resultant axial loads to the body 10 but this cooperation does not materially interfere with flexure of the couplings. Furthermore, the couplings are readily flexed during installation of the line to accommodate minor misalignments and inaccuracies of the installation. As already described, the seal rings 24 are relieved of all axial or end loads tending to separate the tubes 10 and, therefore, are not distorted or extruded by such loads. The seal rings 24 are arranged and confined to be most effectively actuated by the fluid pressure being handled to maintain fluid-tight seals between the tubes 10 and the body 12. The couplings are constructed so as to be readily assembled around the end portions of the tubes 10 as will be understood by reference to the drawings.

The coupling of the invention illustrated in Figure 3 incorporates seal rings 324 of relatively small cross section and, if desired, having a cross sectional dimension less than the height of the tube beads 11, the coupling accommodating seal rings constructed of materials having little or no resiliency and elongation. In this coupling the body 12 and nut 13 may be the same as above described and the coupling includes two retainers 315 and a "floating" spacer 325 of special configuration for accommodating the seal rings 324. The retainers 315 are provided at the beads 11 and are hat-shaped in cross section, each having main portion or web fitting in the body 12 and two end flanges 322 of L cross section surrounding the tubes 11 with clearance. The retainers 315 are split in the same manner as the retainers 15 to be readily sprung over the beads 11 to straddle the same and to each have a flange 322 at each side of its respective bead. One retainer 315 has a flange 322 bearing axially against and fitting within the body end flange 17 and the other retainer 315 has one of its flanges 322 bearing against and fitting within the nut flange 20. The spacer 325 is a rather long tubular element arranged in the body 12 between the two retainers 315. The spacer 325 surrounds the end portions of the tubes 10 with clearance and its opposite ends have internal annular corner grooves 301 for containing the seal rings 324. The inner flanges 322 of the retainers 315 may enter these grooves 301 to be engaged or sealed against by the seal rings.

The seal rings 324 contained in the grooves 301 are relatively small in transverse cross section and their cross section may be comparable to or even less than the height of the beads 11. The material of the seal rings 324 may be rubber, rubber composition, synthetic rubber and like flexible resilient materials or may be sealing material having little or no resiliency such as asbestos compositions, Teflon, and the like. The rings 324 seal with the external surfaces of the tubes 10 and with the peripheral walls of the grooves 301, the end walls of the grooves and the ends of the L flanges 322 of the retainers 315 retaining or confining the seal rings. The coupling of Figure 3 is assembled in substantially the same way as the couplings of Figures 1 and 2 although in this case the seal rings 324 of small cross section are easily worked or sprung over the beads 11.

Figure 4 of the drawings illustrates the invention utilized to flexibly couple a tube 10 with a female fitting or boss 400 which may be attached to or form a part of a pump, tank, cylinder and piston mechanism, or the like. The boss 400 has a fluid opening or passage 401 provided at its outer end with a counter bore or socket 402. The socket 402 is cylindrical and extends to the outer end of the boss. The boss 400 also has an external thread 403 so that the nut 13 of the coupling may be threaded thereon. The bore or passage 401, or at least its outer portion, is adapted to receive the end of the tube 10 with clearance and the socket 402 receives the bead 11 with considerable clearance. A seal ring 24, such as used in Figure 1, is arranged in the inner or bottom portion of the socket 402 and seals between the surface of the tube 10 and the wall of the socket. A split retainer 15 of the kind used in the coupling of Figure 1 is sprung over the bead 11, prior to entering the tube 10 into the bore 401, to straddle or engage around the bead. The retainer 15 is adapted to fit in the socket 402 and a follower or gland 414, similar to the gland 14, is provided to engage the outer end of the retainer. The gland 414 is actuated or engaged by the flange 20 of the nut 13. The flange 20 and the gland 414 are proportioned to be passed over the tubing bead 11. The seal ring 24 is positioned or retained between the inner flange 22 of the retainer 15 and the end wall of the socket 402 and its end clearance or engagement, as the case may be, is readily regulated or adjusted by turning or actuating the threaded nut 13. The retainer 15 cooperating with the bead 11 and engaged by the follower 414 assumes the outward end loads or axial forces tending to separate the tube 11 from the boss 400 and yet does not interfere with the desired flexibility of the coupling. Further, it is to be noted that the seal ring 24 is not compressed or distorted by such end loads or forces, being entirely independent of them.

Figures 5A and 5B illustrate a collar or retainer suitable for use in couplings of small diameter and in other situations where sectional readily assembled retainers are desired. This retainer includes two substantially semicircular sections 45 adapted to be assembled over or around a tubing bead 11. The sections 45 have flanges 42 corresponding to the flanges 22 and are proportioned to readily straddle the beads 11 to have the flanges engage therewith. In accordance with the invention the sections 45 are preferably hingedly connected to be readily swung together over the tubing bead 11. Any suitable form of hinge connection may be used. In the construction illustrated the two sections 45 are identical, each being notched at each end to have two spaced tongues 46 at one end and two spaced tongues 47 at the other end. The parts are related so that the tongues 46 of one section 45 are adapted to engage within or between the tongues 47 of the other section. The tongues 47 have internal or inwardly facing depressions or recesses 48 while the tongues 46 are provided with outwardly projecting pivot or hinge projections 49. The tongues 46 and 47 are continuations or extensions of the flanges 42 and are flexible, whereby the tongues 46 may be snapped between the tongues 47 so that the projections 49 snap into the recesses 48. The projections 49 are turnable in the recesses 48 to hingedly connect the sections 45. In assembling the collar of Figures 5A and 5B on a tube 10, one section 45 may be engaged over the bead 11 and the other section may then be arranged over the bead and the two sections manipulated so that the projections 49 snap into the recesses 48. However, it will usually be preferred to first hingedly connect the two sections 45 by snapping the projections 49 of one section into the recesses 48 of the other section to form a readily handled hinged together unit such as illustrated in Figure 5B. This assembly or unit is then arranged over the tube 10 at its bead 11 and is closed about the bead to snap the other projections 49 into the other recesses 48 and thus form an annular retainer around the bead. It is believed that it will be understood how the collar or retainer of Figures 5A and 5B may be employed in the various couplings of the invention.

Figures 6 and 7 illustrate a coupling of the invention characterized by a seal ring cartridge adapted to be held in a clam-shell type clamp, or the like, for assuming the axial loads. We have shown this coupling used with a tube 10 having a bead 11, such as above described, and a second tube 510 having a machined bead 511. The abovementioned cartridge includes a tubular shell or retainer 501 having an internal flange 502 at one end. The retainer 501 is adapted to surround the end portions of the tubes 10 and 510 with clearance and serves to contain the two spaced seal rings 524. The rings 524 may be substantially the same as the seal rings 24 and a spacer 525 is arranged between them. A gland nut 513 is threaded in the end of the retainer 501 most remote from the flange 502. One seal ring 524 is between the flange 502 and one end of the spacer 525 while the other ring 524 is between the end of the nut 513 and the other end of the spacer. With this arrangement the nut 513 may be used to adjust or take up the packing assembly. The seal rings 524 seal between the external surfaces of the tubes 10 and 510 and the internal surface of the retainer 501 in annular regions or zones spaced from the opposing ends of the tubes.

In accordance with the invention any required or appropriate type of clamp or encircling means may be employed to retain the sleeve 501 and to cooperate with the tubing beads 11 and 511 for the assumption of the axial or end loads. In the drawings we have shown a simple clamp for this purpose including a split flexible clamp body 504 of channel shaped cross section for encircling and conforming to the retainer 501. The clamp body 504 has end flanges 505 which project inwardly to adjacent the tubes 10 and 500 at the outer sides of their beads 11 and 511. These flanges 505 are engageable by the beads for the transmission of the end loads between the tubes. It should be noted that with this arrangement the clamp body 504 assumes or transmits the separating end forces from one tube to the other and the seal rings 524 are not subjected to any such forces. Straps or loops 506 and 507 are secured to the clamp body 504 at each side of each split 508. A T bolt 509 is engaged in one loop 506 and passes through a sleeve 512 in the loop 507. A nut 515 on the bolt 509 is tightened against the sleeve to contract or tighten the clamp body 504 on the retainer 501 and to hold the clamp where its flanges 505 are in position to be engaged by the tube beads 11 and 511 to prevent separation of the tubes and to transmit the end loads between the tubes.

Figure 8 illustrates a coupling of the invention having a coupling body 600 provided at one end with an inwardly projecting flange 601 adapted to be passed over the tubing beads 11. A nut 602 is threaded on the other end of the body 600 and has a lip 603 which enters the body and which is also adapted to pass over the tubing beads 11. Suitable washers 604 are arranged against the inner faces of the flange 601 and lip 603. Seal rings 624 are provided in the body 600 at the inner sides of the washers 604 to seal with the surfaces of the tubes 10 and the internal surface of the body. The seal rings 624 are preferably of flexible resilient material such as rubber, rubber composition or synthetic rubber so as to be readily sprung over the beads 11.

The coupling of Figure 8 is characterized by a retainer 607 having ball detent means cooperable with the beads 11 for the transmission of end loads between the tubes. The retainer 607 is a simple tubular part adapted to be slid into the body 600 and adapted to readily pass over the tubing beads 11. Two axially spaced rows of radial openings 608 are provided in the wall of the tubular retainer 607 to hold metal or rigid material balls 609. The diameter of the balls 609 is greater than the thickness of the retainer wall so that the balls project either from the external or internal surfaces of the retainer. The balls 609 are loosely staked in the openings 608, that is the openings are shaped to prevent displacement of the balls and yet allow free limited radial movement of the same.

In assembling the coupling of Figure 8 the body 600 is slid over a tube 10 to a position some distance from its end and its washer 604 and adjacent seal ring 624 are assembled therein. The retainer 607 with its balls 609 is slid over the tube 10, the balls being free to move outwardly as the retainer is passed over the bead 11. The nut 602 and adjacent washer 604 and seal ring 624 are slid on to the other tube. After the tubes 10 have been brought to the desired relative positions, the retainer 607 is moved to the position where it overlaps the opposing ends of the tubes. The coupling body 600, together with its washer 604 and seal ring 624, is moved along the tube assembly to slide or pass over the retainer 607, the body 600 serving to positively move the balls 609 inwardly to positions such as illustrated in Figure 8 where they are engageable with the beads 11 to assume the separating end forces on the tubes. The other seal ring 624 and its washer 604 are then moved into the end of the body 600 and the nut 602 is threaded on the body to complete the assembly. It should be noted that Figure 8 illustrates a coupling having a simple one-piece retainer 607 characterized by ball detents that may be readily passed over the beads 11 in assembling the coupling and that are positively held in their inward active positions by the body 600 where they cooperate with the beads 11 to assume the end forces on the tubes, thus relieving the seal rings 624 of all such forces.

Having described only typical forms of the invention we do not wish to be limited to the specific details herein set forth, but wish to reserve to ourselves any variations or modifications that may appear to those skilled in the art and fall within the scope of the following claims.

We claim:

1. A coupling for connecting two thin walled tubes for relative angular movement, the tubes having external annular beads in spaced adjacent relation to their ends, the coupling including a tubular body arranged around the end portions of the tubes in spaced surrounding relation thereto and protruding beyond the distal sides of the beads, the body having a flange projecting radially inward from one end thereof and the body having a cylindrical imperforate internal surface of substantially uniform diameter extending from said flange to the other end of the body, means having threaded engagement with the other end of the body, and projecting radially inward therefrom, said flange and said threaded engagement means having an inside diameter greater than the greatest outside diameter of said beads, split collars of channel shape cross section engaged over said beads to straddle the same and to surround said tubes, each collar having a cylindrical periphery engaging said internal surface of the body and having flanges projecting radially inward toward the tubes at each side of the respective bead, the distal flange of one of the collars engaging said flange of the body and the distal flange of the other collar engaging said means whereby the collars transmit from the beads to the body the axial forces tending to separate the tubes, said flange of the body, said means and said flanges of the collars being spaced radially from the peripheries of the tubes to thereby permit relative angular movement between the tubes, and seal means in the body in the region between the two collars for sealing between the peripheries of the tubes and said internal surface of the body, said split collars and said threaded means being at the distal sides of the seal means where they do not constitute paths of fluid leakage from the tubes.

2. A coupling for connecting two thin walled tubes for relative angular movement, the tubes having external annular beads in spaced adjacent relation to their ends, said beads being arcuate in cross section, the coupling including a tubular body arranged around the end portions of the tubes in spaced surrounding relation thereto and protruding beyond the distal sides of the beads, the body having a flange projecting radially inward from one end thereof and the body having a cylindrical imperforate internal surface of substantially uniform diameter extending from said flange to the other end of the body, means having threaded engagement with the other end of the body and projecting radially inward therefrom, said flange and said threaded engagement means having an inside diameter greater than the greatest outside diameter of said beads, split collars of channel shape cross section engaged over the beads to straddle the same and to surround the tubes, each collar having a cylindrical periphery engaging said internal surface of the body and having flanges projecting radially inward toward the tubes at each side of the respective beads, the inside diameter of said flanges of the collars being greater than the outside diameter of said tubes and substantially less than the greatest outside diameter of said beads, said flange of the body, said threaded means, and said flanges of the collars presenting flat faces lying in planes perpendicular to the longitudinal axis of the body, the distal flange of one collar having its flat face in engagement with the flat face of said flange of the body and the distal flange of the other collar having its flat face in engagement with the flat face of said means whereby the collars transmit from the beads to the body the axial forces tending to separate the tubes, and seal means in the body in the region between the two collars comprising seal rings bearing against the proximal flanges of the collars and sealing with said internal surface of the body and the peripheral surfaces of the tubes, and a spacer in the body between the seal rings, said threaded engagement of said means with the body being at the distal side of the closest adjacent seal ring so as to not constitute a path of fluid leakage from the tubes.

3. A claim as in 2 and wherein said collars are circumferentially split.

References Cited in the file of this patent

UNITED STATES PATENTS

| | | |
|---|---|---|
| 1,043,412 | Faunce | Mar. 15, 1912 |
| 1,857,297 | Faulkner | May 10, 1932 |
| 2,428,077 | Herold | Sept. 30, 1947 |
| 2,459,609 | Wolfram | Jan. 18, 1949 |
| 2,460,032 | Risley | Jan. 25, 1949 |
| 2,535,694 | Payne | Dec. 26, 1950 |
| 2,599,389 | Hume | June 3, 1952 |

FOREIGN PATENTS

| | | |
|---|---|---|
| 27,656 | Great Britain | Dec. 1, 1913 |
| 264,030 | Great Britain | Jan. 13, 1927 |
| 63,357 | Netherlands | June 15, 1949 |
| 674,429 | Germany | Apr. 14, 1939 |
| 780,507 | France | Feb. 4, 1935 |
| 782,322 | France | Mar. 11, 1935 |
| 831,135 | France | May 30, 1938 |